United States Patent [19]
Blank et al.

[11] Patent Number: 5,847,894
[45] Date of Patent: Dec. 8, 1998

[54] DISK AND STORAGE DEVICE HAVING AN ANTI-ALIAS DATA PATTERN LOCATED ON A SERVO SECTOR

[75] Inventors: Timothy James Blank, Byron; Kevin Jack Erickson, Rochester, both of Minn.

[73] Assignee: International Business Machines Corporation, Armonk, N.Y.

[21] Appl. No.: 778,278

[22] Filed: Jan. 2, 1997

Related U.S. Application Data

[63] Continuation of Ser. No. 366,533, Dec. 30, 1994, abandoned.

[51] Int. Cl.$^6$ ............................................................ G11B 5/58
[52] U.S. Cl. .................................. 360/77.01; 360/77.08; 360/48
[58] Field of Search ............................ 360/75, 71, 77.04, 360/77.08, 48, 49, 53, 40, 47, 78.04, 78.05, 78.09, 78.14

[56] References Cited

U.S. PATENT DOCUMENTS

| | | | |
|---|---|---|---|
| 4,027,338 | 5/1977 | Kril | 360/77.08 |
| 4,048,660 | 9/1977 | Dennison et al. | 360/77.08 |
| 4,166,970 | 9/1979 | Cardot et al. | 318/561 |
| 4,530,020 | 7/1985 | Sutton | 360/77.08 X |
| 4,536,809 | 8/1985 | Sidman | 360/77.04 |
| 4,984,100 | 1/1991 | Takayama et al. | 360/49 |
| 5,041,926 | 8/1991 | Ockerse et al. | 360/77.05 |
| 5,117,408 | 5/1992 | Weispfenning et al. | 369/32 |
| 5,136,439 | 8/1992 | Weispfenning et al. | 360/77.08 |
| 5,136,440 | 8/1992 | Sidman | 360/78.04 |
| 5,274,510 | 12/1993 | Sugita et al. | 360/49 |
| 5,301,072 | 4/1994 | Wilson | 360/77.01 |
| 5,311,376 | 5/1994 | Joan et al. | 360/51 |

*Primary Examiner*—Aristotelis M. Psitos
*Assistant Examiner*—Kin Wong
*Attorney, Agent, or Firm*—Merchant, Gould, Smith, Edell, Welter & Schmidt

[57] ABSTRACT

A demodulator system for identifying the position of a transducer assembly over a disk of a direct access memory device. The demodulator identifies alias cases and uses information placed in the boundary between tracks to generates a more robust indication of the location of the transducer assembly.

4 Claims, 9 Drawing Sheets

DISK AND STORAGE DEVICE HAVING AN ANTI-ALIAS DATA PATTERN LOCATED ON A SERVO SECTOR

This is a continuation of application Ser. No. 08/366,533, filed Dec. 30, 1994 now abandoned.

TECHNICAL FIELD

The present invention relates to an improved demodulator system for determining the position of a transducer head over a magnetic media. The demodulator system is used in a direct access storage device and is especially useful in sector servo devices which use magneto-resistive (MR) head technology.

BACKGROUND OF THE INVENTION

Some high density direct access storage devices use separate transducer elements for writing information to the disk and for reading information back from the disk. In some instances the transducer elements can write "wide" and read "narrow". In many write "wide" read "narrow" systems the read back element is implemented with magneto-resistive (MR) technologies. The principle benefit of such systems is increased storage density.

A write "wide" transducer element will record information over slightly less than one full data track width (80–90%). In the read mode the active area of the transducer may only occupy about one half of the full data track width (40–60%). This relatively narrow read area is necessary for data read back but places additional demands on the demodulator processes. To accommodate narrow read systems, designers must adopt narrower pitch servo patterns. Some designers have adopted ⅓ or ¼ track servo patterns rather than the traditional ½ track servo pattern. In general narrower servo patterns require better system tolerances for a given performance level. The electromechanical components, the channel module electronics and the servo pattern alignment are all items that can contribute to the effective mis-alignment of the servo burst pattern and the encoded grey code. The effective alignment of the encoded grey code and servo burst patterns is dependent on and can vary with servo pattern generation accuracy and radial transducer read element velocity with respect to the pattern. At present ⅓ track servo patterns are known in the art and are being used. In this context existing demodulator processes and structures can resolve the location of a narrow read transducer element tolerating grey code to servo burst data effective misalignments ⅙ of a track width on either side of a track boundary. This ability adds robustness to the overall system. However in some instances more than a ⅙ track robustness is required and greater robustness is always desirable. For example if the read transducer element perceives misalignments of more than ⅙ track width in the vicinity of the track boundary, a so called "alias" case can occur. In this instance a demodulator exhibiting a ⅙ track robustness will be unable to correct for amount of misalignment and will incorrectly report the position of the transducer assembly.

In an alias case the transducer element "side" reads encoded grey code information from an adjacent track as the transducer head moves near the boundary between two tracks. Consequently the transducer element does not generate the "correct" translated grey code in that the corrected translated grey code does not agree with the appropriate encoded grey code. This ability to report the wrong track identifying information is troublesome because the aliasing event presents the demodulator with ambiguous location data. If the demodulator incorrectly resolves the true location of the transducer head during that servo sector pass the controller logic will normally prevent any write activity. If this problem persists for several consecutive sectors the overall performance of the direct access storage device is quickly and seriously degraded.

SUMMARY OF THE INVENTION

The invention discloses a direct access storage device and a disk useful in such a device. The invention also discloses an improved demodulation process which can efficiently resolve the location of the transducer assembly with ⅙ track alias robustness. In a second more preferred embodiment, the demodulator process can efficiently resolve alias events based upon an additional anti-alias bit pattern applied to the disk. This second embodiment gives a ⅓ track of alias robustness which is a factor of two improvement over the first embodiment.

The direct access storage device has a disk which may rotate in a housing. The disk has a large number of concentric tracks. Each track has a track centerline and a track width and a track boundary which is formed between adjacent tracks. Servo sectors are located on the tracks and each servo sector has amplitude burst data patterns encoded on the disk in said servo sectors. It should be appreciated that phase burst servo data pattern could be used as well. Each servo sector has encoded track identifier data located in the servo sector. This encoded track identifier data pattern extends across the entire track width and terminates at the track boundary. Grey code is used as an exemplary and illustrative coding scheme for the track identifier but other codes could be used as well. It is preferred to encode an anti-alias data pattern in each servo sector and this anti-alias data pattern extends across the track boundaries from a first track centerline to an adjacent track centerline. It is most convenient to have the anti-alias pattern extend from one centerline to the next but shorter anti-aliasing bits are contemplated within the scope of the invention as well. The direct access storage device will also have a transducer assembly coupled to a channel module. The transducer assembly is mounted on an actuator arm which is moved by several control mechanisms. A demodulator is coupled to the channel module and it converts the encoded track identifier data pattern and the burst data into a position word representing the location of the transducer assembly with respect to said disk.

The method for demodulating or determining the location of a transducer assembly over a moving disk is described in the context of ⅓ burst data which can be converted into a primary (P) and a quadrature signal (Q). For purposes of illustration the position word is described in terms of a "base variable" (BV) and an offset amount (OA). The stepwise sequence first compares the primary signal to the quadrature signal, to determine which of the two is closest to zero. The closest to zero variable is taken as the base variable. Next the primary and quadrature signal values are compared to zero to determine the sign of the base variable. Next the encoded track identifying information is used to detect the existence of an alias case, to determine a grey code correction factor and offset amount. This grey code correction factor is applied to the track identifier (translated Grey Code) when an alias condition is detected. This process can also be used with the anti-alias bit described above. In this instance the value of a so called grey flag is set to identify the state of the anti-alias bit and therefore further refine the indication of assembly transducer position. The value of this anti alias bit is used to correct the translated grey code and offset amounts used to form the full resolution position word.

BRIEF DESCRIPTION OF THE DRAWINGS

The drawings show an illustrative and exemplary embodiment of the invention. Throughout the several views identical reference numerals indicate identical structure wherein.

DETAILED DESCRIPTION

Figure 1:
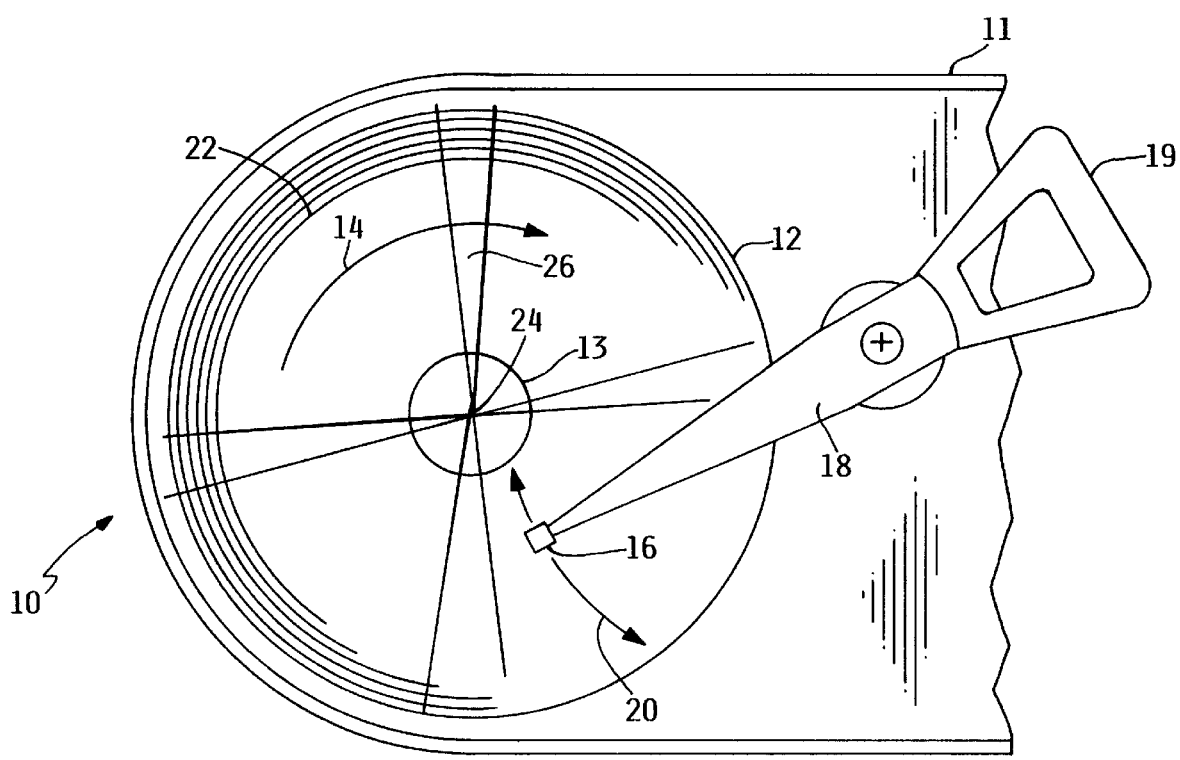
FIG. 1 is a view of a portion of a direct access storage device.

FIG. 1 shows a direct access storage device 10 having a device housing 11. In this example there are several magnetic media disks typified by disk 12. The disks are turned by a spindle motor assembly 13 about an axis 24 in a direction represented by arrow 14. A representative transducer head assembly 16 is connected to an actuator arm assembly 18 which can move in an arc represented by arrow 20. A voice coil motor assembly 17 (shown in FIG. 2) including a voice coil 19 is coupled to the actuator arm assembly 18. Together these elements position the transducer head assembly 16 over the disk 12. Information is stored in concentric tracks which are defined on the disk 12 as typified by track 22. Each track is segmented along the direction of motion forming sectors. Sector 26 represents one of many sector areas on the disk 12.

Figure 2:
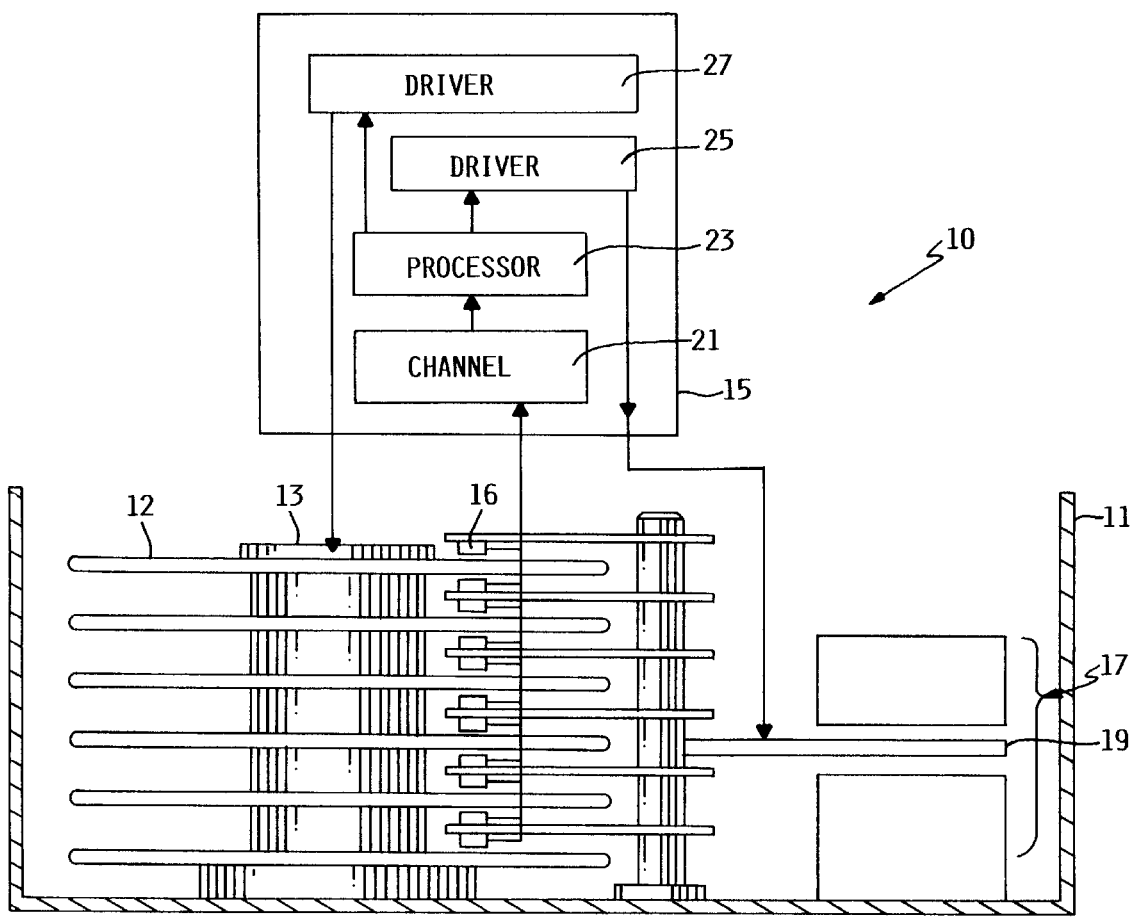
FIG. 2 is a view of a portion of a direct access storage device.

FIG. 2 shows a view of the direct access storage device 10 and a simplified schematic of the controller 15 system. In general the direct access storage device 10 has both a track "seeking" mode and a track "following" mode. During these modes, the transducer head assembly 16 passes over the servo sectors and reads the servo data. The transducer head assembly 16 is coupled through a preamplifier (not shown) to a channel module 21 located within the controller 15. The channel module 21 processes the signals from the read element of the transducer head assembly 16 and translates the transducer signals into analog and digital data for the demodulator process among others. One portion of this digitized data is referred to as the "translated grey code". In this exemplary and illustrative embodiment this number is twelve bits long, but only the two least significant bits are required for some of the demodulator functions. The decimal value of the least two significant bits of translated grey code are referred to as the "grey code modulo 4" value. This modulo 4 value will be 0,1,2, or 3 in value. These numbers should not be confused with the information pattern physically written on the disk 12 during manufacture. The information on the disk 12 is called the "encoded grey code" and the translated grey code is derived from this encoded information.

The channel module 21 in turn is coupled to a processor 23 which executes a stored program to perform several control functions. For example the processor 23 executes a stored program that controls voice coil motor currents and spindle motor currents. In the drawing the voice coil motor assembly 17 receives drive current from the voice coil driver 25. In a similar fashion, the spindle motor assembly 13 receives drive current from the spindle motor driver 27. Thus the processor 23 is used for a number of closely related and interrelated control processes. For purposes of this disclosure the processor 23 executes a stored program that generates a representation of the position of the transducer head assembly 16 over the disk 12. Typically this demodulator receives "translated grey code" and quad burst information from the channel module which reads the "encoded grey code" and quad burst signals (A,B,C,D) from the disk media. The translated grey code may be modified by the demodulator process as a part of developing a melded position word. The exemplary and illustrative demodulator described derives a grey code correction factor (GCCF) which is added to the translated grey code to give a track identifier code. The output of the demodulator process is abstractly expressed as a base variable (BV); offset amount (OA); and grey code correction factor (GCCF). In this particular instance the information from the demodulator is used to form a full resolution position word comprised of, for example, twenty-four bits. This position word may have twelve bit of integer position data derived from the encoded grey code and twelve bits of fractional position information derived from the quad burst data. This representative and exemplary position word represents the measured position of the transducer head assembly 16 over the disk 12.

Figure 3A:
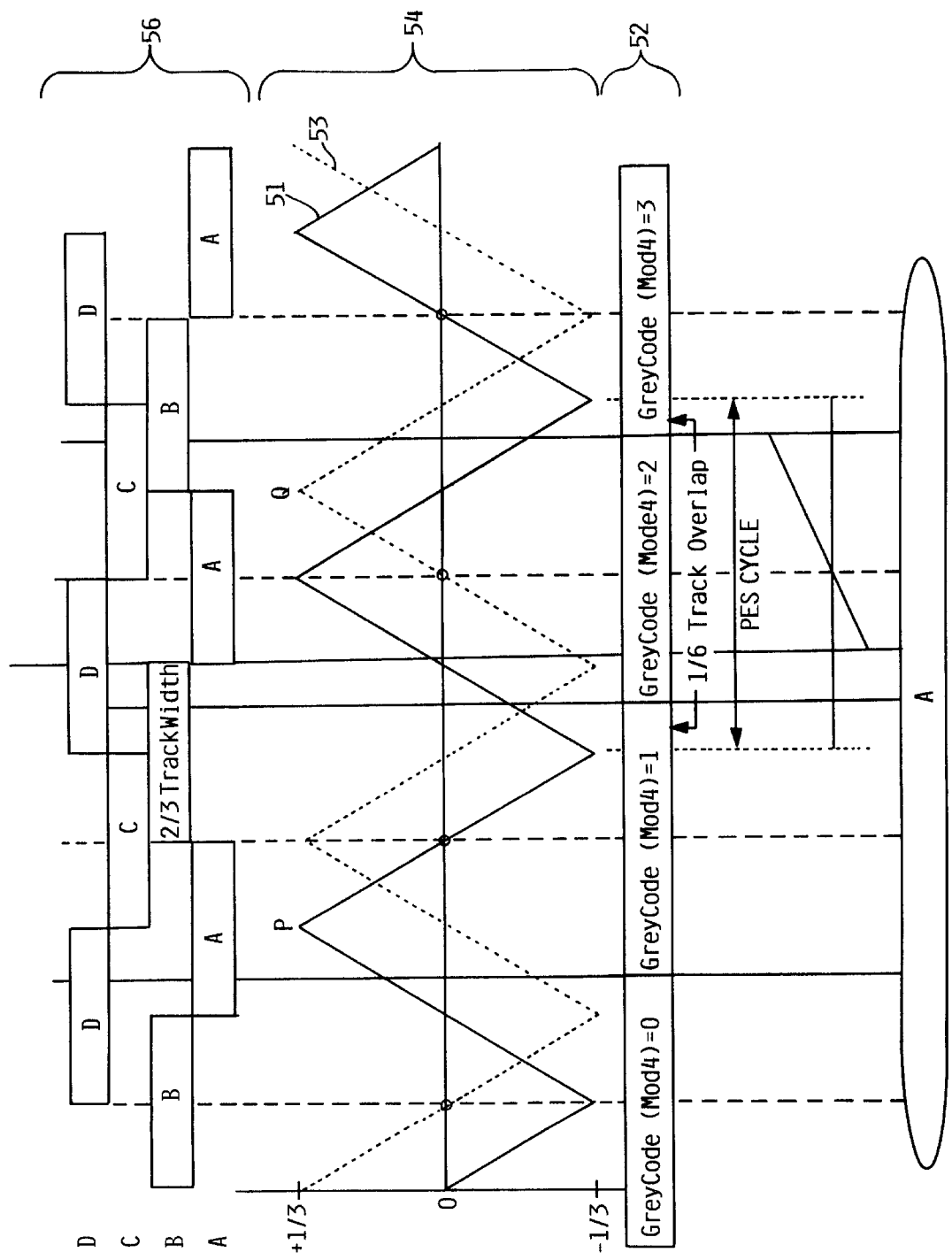
FIG. 3 is a hybrid diagram of servo data patterns on a disk and representative analog signals corresponding to the location of a transducer element with respect to the servo patterns.
Figure 3B:
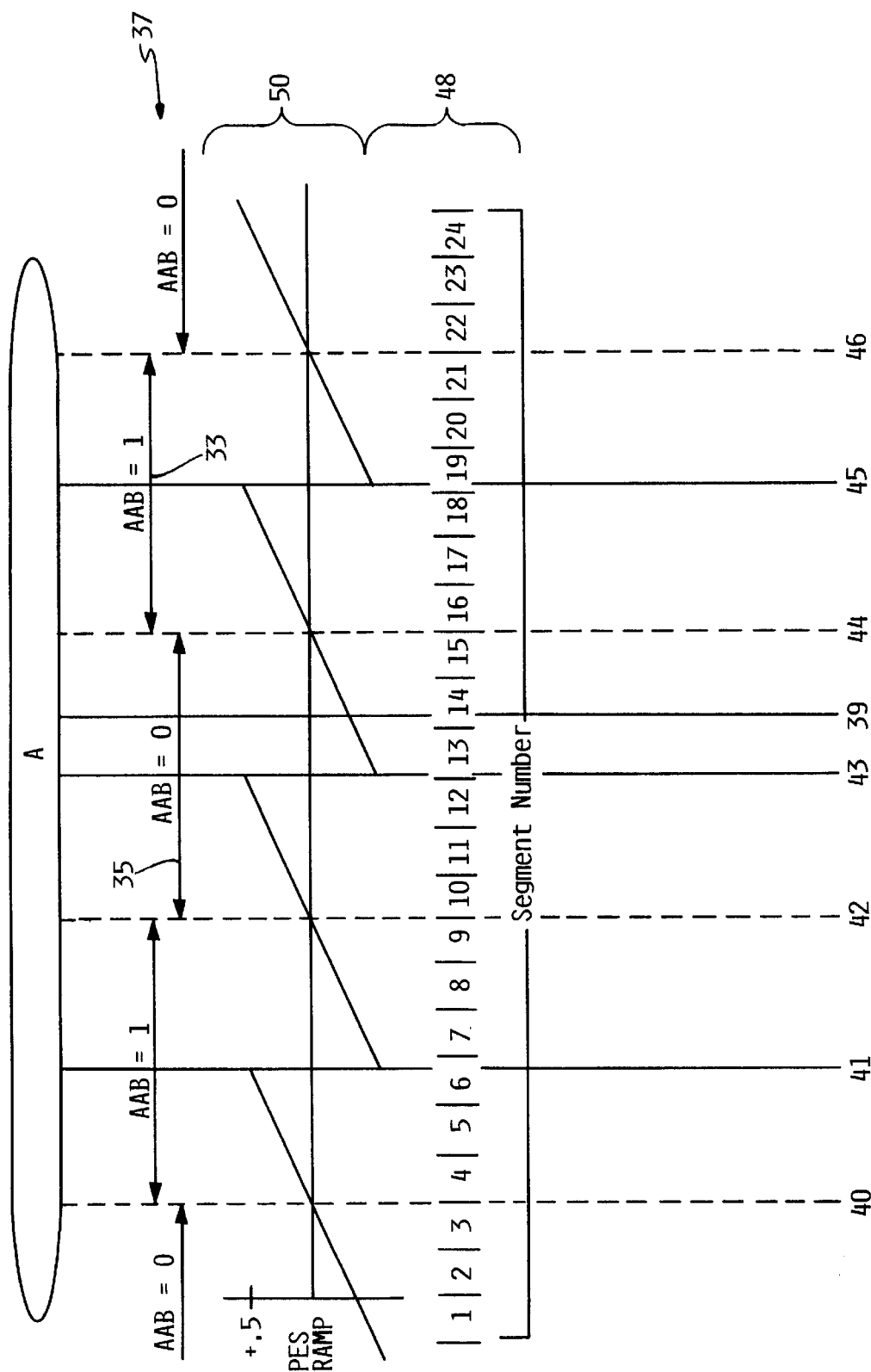

FIG. 3 is a hybrid diagram which mixes depictions of recorded servo information patterns with representative analog signals. The diagram also shows both physical track locations and potential paths that the transducer head assembly may traverse. The diagram shows four data tracks. The dashed vertical lines represent particular paths over the disk. The center line of one track is shown as path 40. The center lines for the other companion tracks are represented as path 42, path 44 and path 46. The boundary between adjacent tracks are shown by solid lines as boundary 41, boundary 43, and boundary 45.

Area 48 shows numbered segments. These segments are a conceptual construct used to facilitate a description of the demodulation process. These segment numbers are for reference only and each segment is defined as ⅙ of a track wide. The nominal dimension of the transducer read sensor is approximately three segments wide. Therefore a transducer assembly 16 moving along the center line of the track corresponding to path 42 will pass over seg8, seg9, seg10, and seg11. If the transducer area is three segments wide it will most likely pass over portions of four segments. The transducer read element integrates all of the signals beneath and slightly to the side of it so the output of the transducer depends strongly on specific path taken by the transducer.

Area 52 is devoted to storing track identifier information. A binary number is usually encoded onto the disk to identify each individual track on the disk. Grey code is a binary code in which the value in only one of the bit positions of all the bit positions changes as the number is incremented or decremented. In general, the total number of bits of grey code determines the largest number of uniquely identified tracks that may be placed on a disk 12. In the present instance, twelve bits of grey code are placed on the disk during manufacture to uniquely identify each track on the magnetic media. Therefore for each track a unique twelve bit grey code number is stored in area 52. As previously discussed this number is referred to as the "encoded grey code" value.

The grey code read from the disk is converted to a conventional binary number and this "translated grey code" value is shown on FIG. 3 across each track. The demodulation decision processes depicted in FIG. 5 and FIG. 6 rely only on the translated grey code processed by the channel module 21. Throughout the specification the value of the least significant bits of the translated grey code is described as the modulo 4 value of the grey code number. In the drawing the track at path 40 has a modulo 4 value of "0" while the adjacent track at path 42 has a modulo 4 value of "1". In a similar fashion track at path 44 has a modulo 4 value of "2" and the track at path 46 has a modulo 4 value of "3". This pattern will repeat radially across the disk 12. The encoded grey code area for each track and the modulo 4 value for each track is shown extending across the full width of each track.

Area 37 contains an extra bit of information which is important to the increased robustness of the overall direct access storage device. This so called anti-aliasing bit (AAB) assists in transducer assembly location demodulation according to a preferred embodiment of the invention. This AAB is shown in the most significant bit (MSB) location near the encoded grey code location in area 52. It should be appreciated that the least significant bit (LSB) location could be adopted as well. In general this anti-alias bit (AAB) pattern may be located at any location within the servo sector. However appending the anti alias bit to the encoded grey code facilitates decoding and is preferred for that reason. This particular anti-alias bit pattern physically crosses track center lines and extends between the centerline of the track corresponding to path 42 to the center line of track corresponding to path 44 for the exemplary anti-alias bit 35 (AAB). Throughout this region the value of the anti-alias bit is zero. By way of contrast, the anti-alias bit 33 has a value of one and extends from the center line of the track corresponding to path 44 to the center line of the track corresponding to path 46. Thus encoded grey code lies between track boundaries and anti-alias bits lie between track center lines in the illustrative case.

Area 54 represents the analog amplitude signal output of the channel module 21 as the transducer read element passes over the burst pattern data shown in area 56. As the transducer element passes over the burst data, the channel module 21 generates a primary signal (P) corresponding to trace 51 and a quadrature signal (Q) corresponding to trace 53. The burst data may be algebraically related to the primary signal and quadrature signal as: $P=k(A-B)$ and $Q=k(C-D)$ where k is a calibration constant and A,B,C, and D are the amplitude values of the burst pattern signals. In general the fractional component of the position word is uniquely identified in part by the analog value of P or the analog value of Q. The two phase related signals are required to ensure that at least one of the two signals is in a linear region near a value of zero for any arbitrarily selected path.

Area 50 shows an analog representation of the position signal called the PES ramp. This information is indirectly used by the controller to generate the control signals which physically position the transducer assembly 16. Deciding which of the two values to use as the base variable (BV) for computing PES ramp is one task of the demodulator. The potential values for this base variable are +P, −P, +Q, −Q. Another task of the demodulator is determine the appropriate value for the offset amount (OA). The relationship between the primary (P) and quadrature (Q) signals in conjunction with Grey Code modulo 4 value is used by the demodulator to determine an offset amount which can be $+\frac{1}{3}$, $-\frac{1}{3}$, or 0. Algebraically, the value of the PES ramp signal is the base variable added with the offset amount (PES ramp=BV+OA). Consequently once one has the appropriate base variable value, and offset amount value, the required PES ramp value may be readily computed. The final task of the demodulator is to determine the grey code correction factor (GCCF). This factor is determined such that the fractional component (PES ramp) can be algebraically merged by addition with the track identifier code (Track Identifier=Translated Grey Code+GCCF).

FIG. 3 may also be used to help visualize the problem addressed by the invention. Consider a transducer assembly moving along path 39. The transducer assembly would pass over seg14. If the transducer element is over the track with a grey code modulo 4 value of 2 but reads the adjacent tracks grey code modulo 4 value of 1, then the demodulator is presented with translated grey code data which is inconsistent with the primary (P) and quadrature (Q) data. In essence the translated grey code and quad burst data are "misaligned". Consequently, the demodulator will be unable to resolve the position of the transducer assembly without additional information. The inability to resolve this alias case is explained in connection with FIG. 5. process.

Figure 4:
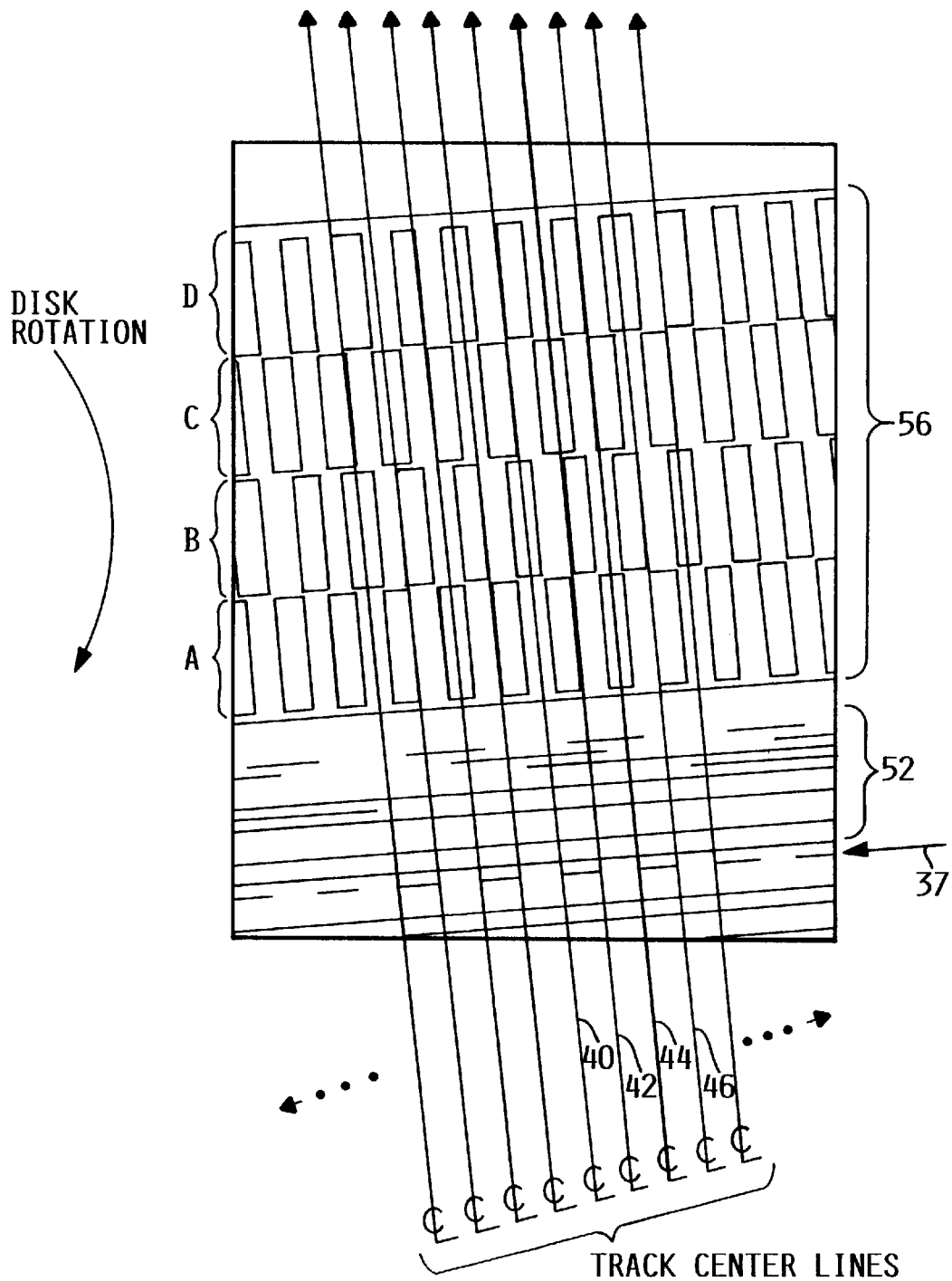
FIG. 4 is an image representing servo data information present on a disk.

FIG. 4 represents an image of data patterns developed from a disk practicing the invention. The burst code information is shown in area 56 and is a composite of patterns A,B,C, and D. The anti-alias bit 37 is shown in the MSB position with respect to the twelve bit encoded grey code in area 52. The path lines correspond to those presented in FIG. 3 and show the physical location of various track center lines.

Figure 5A:
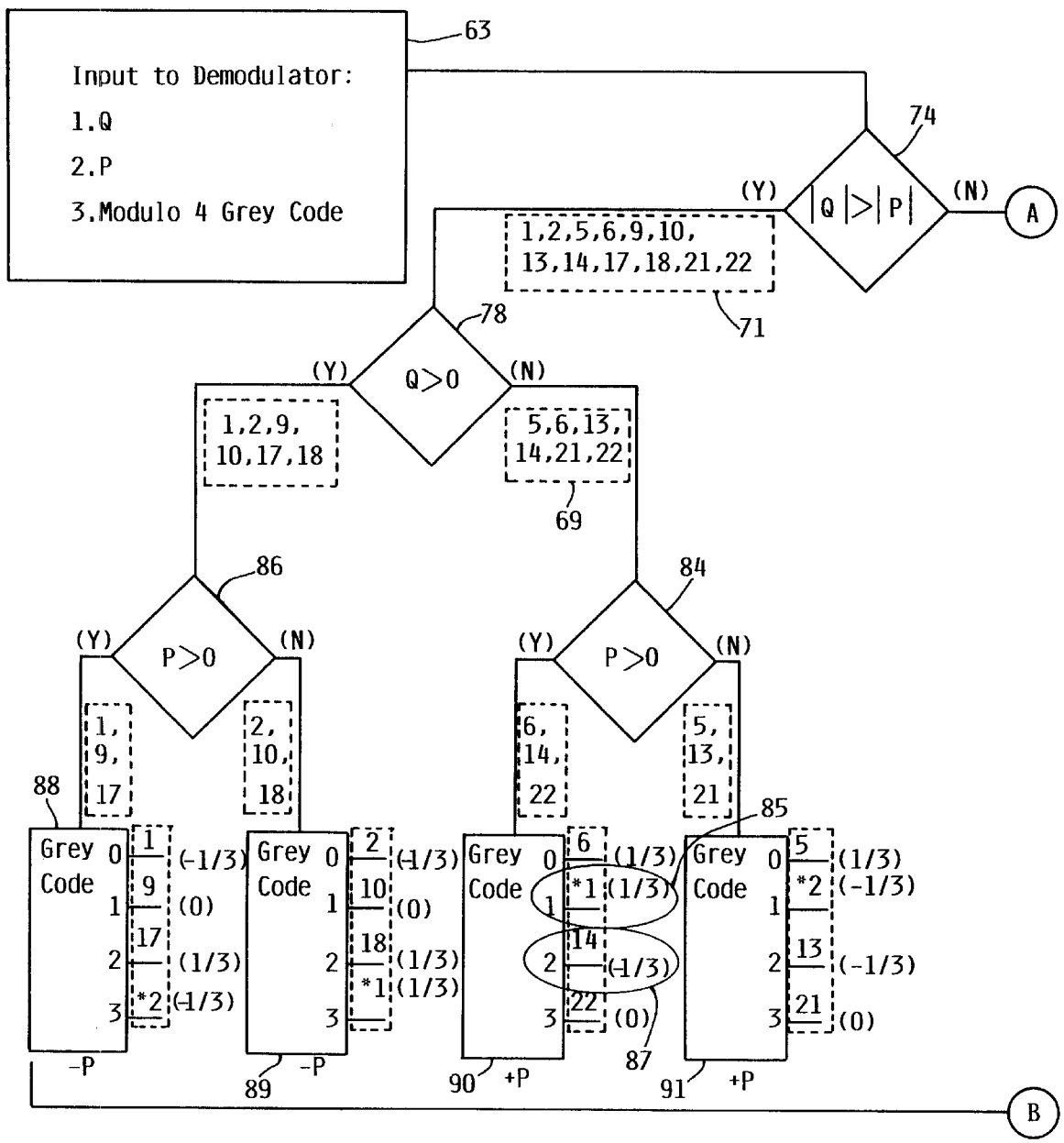
FIG. 5 is a decision tree depicting steps in the first embodiment of the demodulation process.
Figure 5B:
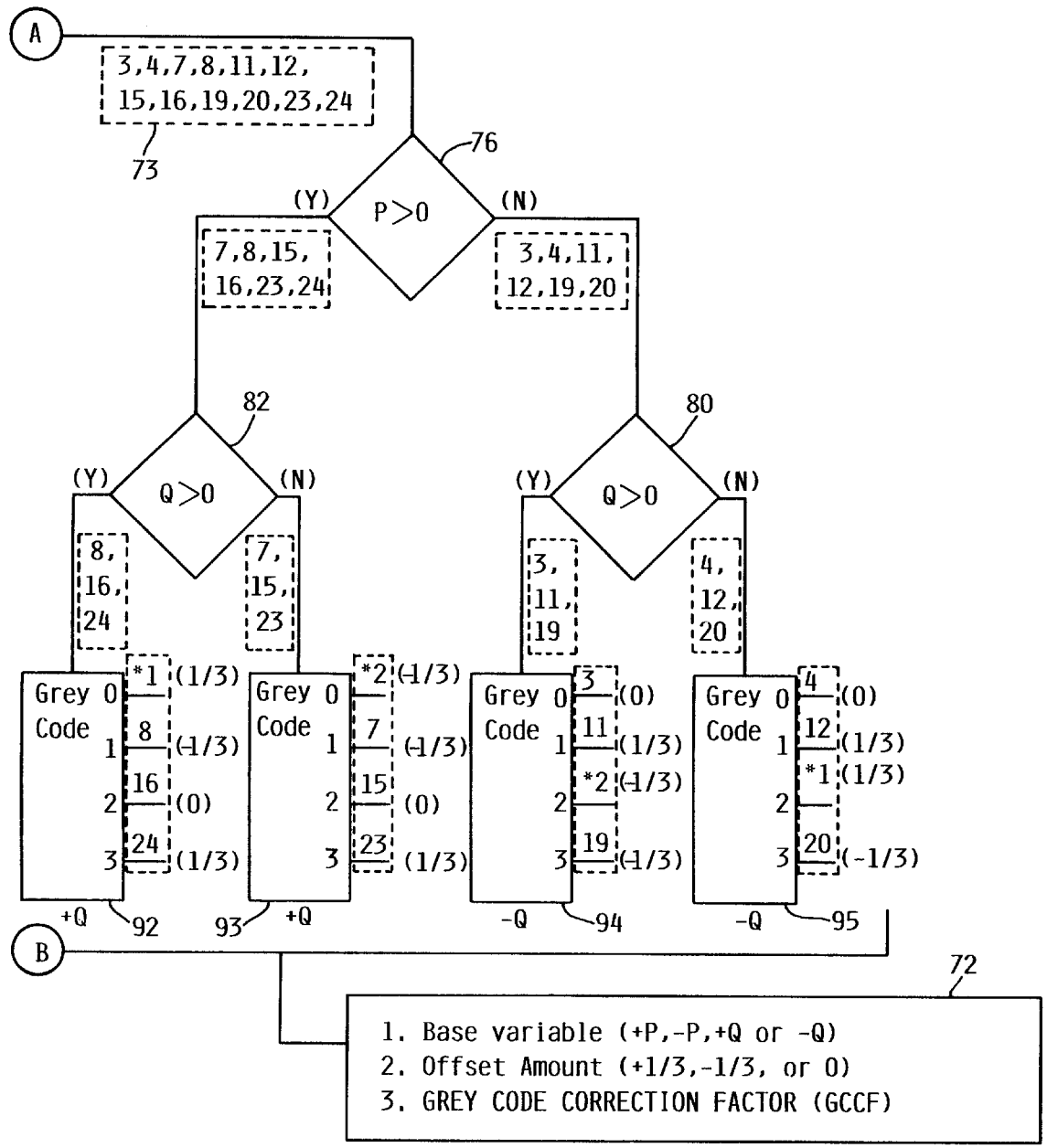

FIG. 5 represents an efficient demodulation process which sequentially derives the transducer assembly position from the information presented schematically in FIG. 3. In contrast to prior demodulators, the determination of which base variable value (P or Q) is known after the first node of the binary decision tree. The stored program used to perform the improved process may be stored more efficiently and exhibits improved real time performance. Both of these attributes are desirable in a direct access memory device. However the FIG. 5 process cannot resolve transducer assembly locations with more than $\frac{1}{6}$ track, or one segment of effective misalignment, in the presence of adjacent track translated grey code. In FIG. 3 the period or cycle length of the P or Q signal depicted is $\frac{4}{3}$ of the track width. This overlap gives rise to the magnitudes of the robustness for the FIG. 5 process. The FIG. 6 process can resolve alias cases when the transducer is within $\frac{1}{3}$ of a track (two segments) of a track boundary representing a twofold improvement in anti-alias robustness. This improved robustness allows for more economical manufacture or improved seek performance for the direct access memory device.

Figure 6A:
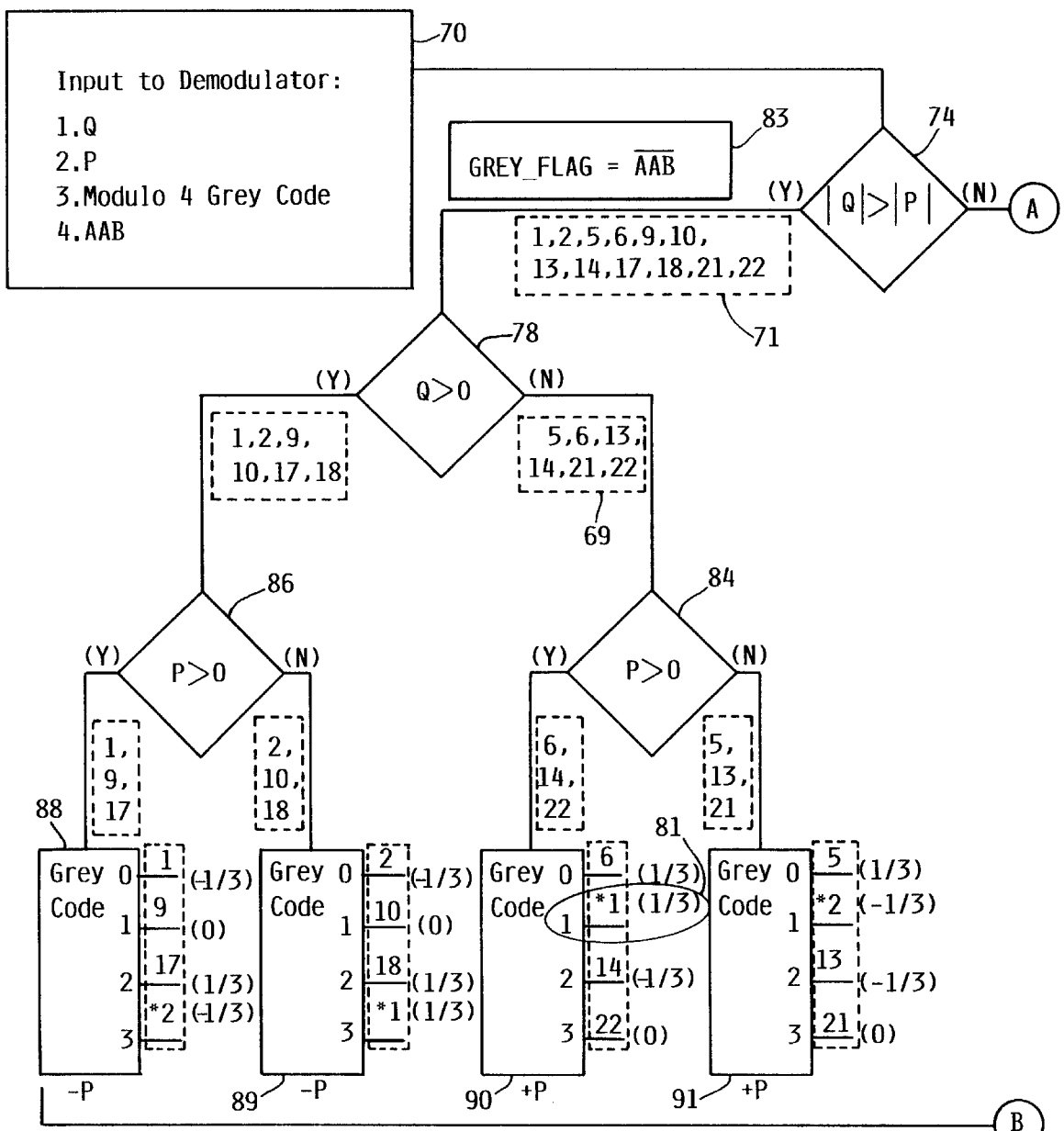
FIG. 6 is a decision tree depicting steps in the second preferred embodiment of the demodulation process.
Figure 6B:
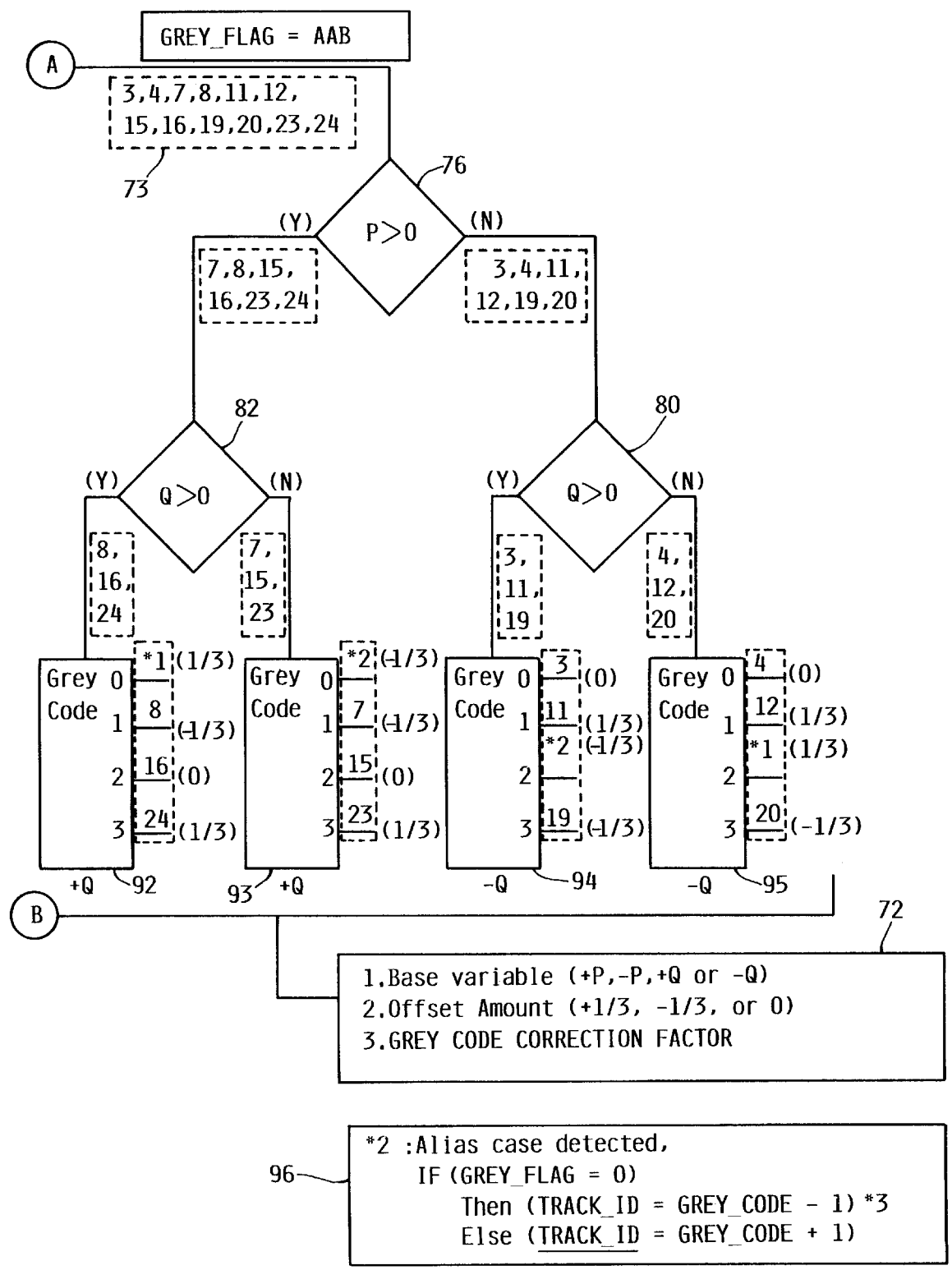

FIG. 5 and FIG. 6 are closely related. FIG. 5 represents an efficient demodulation process while FIG. 6 represents the improved demodulation process utilizing the anti-alias bit pattern. FIG. 5 and FIG. 6 represent similar binary decision trees and identical reference numeral are used to identify identical steps in the two figures. In either instance the demodulator function will typically be implemented as software running in a processor 23. A digital signal processor (DSP) is normally preferred because of speed requirements and the math oriented instruction set. In general the two processes begin by comparing the absolute value of Q to the absolute value of P in block 74. After this node the identity of the base variable (BV) is known but not its sign. This comparison operation sequentially narrows the segment number as displayed in the segment boxes typified by segment box 71. Next the tree branches and the quad burst values P, or Q are compared to zero in block 78, or block 76, followed by the comparison to zero of the complimentary base variable (P or Q) in block 86, block 84, block 82 or block 80. After the comparison operations the tree branches to grey code demultiplexer blocks shown as block 88, block 89, block 90, block 91, block 92, block 93, block 94, and block 95. The grey code demultiplexer blocks output the appropriate offset amount based upon the modulo 4 translated grey code input data. However in certain instances where alias events are detected the translated grey code value will require an additional correction. A grey code correction factor (GCCF) is computed if required (normally 0 except in aliases cases) in accordance with processes shown in block 98 and 99 in FIG. 5 for that demodulation process. Block 96 and block 97 in FIG. 6 represent the procedures to correct grey code for the FIG. 6 process. The output of the demodulator process is shown in box 72 and may be abstractly expressed as [BV;OA;GCCF]. Subsequent processing provides position data expressed as a twenty four bit number having twelve bits of integer base variable as provided by the corrected grey code and twelve bits of fractional information as provided by the PES ramp value.

The alias problem can be restated or visualized in terms of the segment numbers shown in FIG. 3. In general terms, the demodulator must resolve which segment number corresponds to the transducer head location. The process begins with sequential comparisons of the P and Q values. This process partitions the segment numbers into several groups. Then the modulo 4 value of the translated grey code is applied to identify alias conditions. If an alias case exists then the value of the anti-alias bit is used to resolve the alias case.

FIG. 5 will be described in more detail to describe an incorrectly resolved alias case in a step-wise fashion. The process begins at block 63 with the delivery of digitized values for the quadrature signal (Q); the primary signal (P) and the translated grey code expressed as modulo 4 to the demodulator decision tree logic. The process ends at block 72 with the delivery of the transducer assembly position resolved and represented by base variable; offset amount and grey code correction factor.

Consider the motion of the transducer assembly along path 39 as shown in FIG. 3. The transducer assembly tracks over burst data shown in area 56 giving rise to the P and Q values shown in area 54. In this example the value of P is positive and smaller in magnitude than the negative value of Q. In this specific example assume that P=0.05 and Q=−0.25.

In block 74 the absolute values of the Q signal and P signal are compared. In the example the P value is positive and the Q value is negative. The magnitude of the Q value exceeds the magnitude of the P value. Consequently the segment number must be one of the twelve values contained in box 71. Next the process branches to block 78 where the sign of Q is tested and since the example value is negative, the process branches to block 84. At this point the segment number must be one of those contained in box 69. At block 84 the sign of the P value is evaluated and since the example value is positive the process branches to grey code demultiplexer block 90. In block 90 the translated grey code modulo 4 value provided by the channel is utilized to determine the offset amount (OA). If the modulo 4 is "2" then the transducer assembly position is correctly resolved to seg14 (shown by 87), and the values presented by the output block are [+P;−⅓;0]. However consider the result if the transducer element reads a grey code modulo 4=1 (adjacent track). In this instance the grey code demultiplexer block 90 detects the alias condition indicated by the *1 in the figure at 85. In this instance the process moves to block 98 where the track identifier reported by the demodulator is set equal to the translated grey code −1. In this instance the grey code correction factor from block 98 is a −1.

In this alias case the measured grey code modulo 4=1 so the translated grey code value is "corrected" by decrementing its value by one incorrectly. Consequently the output block 72 also reports an incorrect value for the offset variable (⅓). Thus the demodulator system has failed to properly resolve the position of the transducer element.

Next we consider the same transducer path but use the anti-alias bit 35 shown in FIG. 3 in the process of FIG. 6. The process begins in block 70 where the values of P, Q modulo 4 grey code, and the state of the anti-alias bit are read. In this alias case the value of P, and Q are selected to be the same as the FIG. 5 example. However in this example the value of the anti-alias bit is used to set the so called grey flag (GF).

In block 74 the absolute values of the Q signal and P signal are compared. In the example the absolute value of Q, is greater than the absolute value of P, so the process branches to block 78. and sets the grey flag equal to the negated value of the anti-alias bit (block 83). Therefore in this case the GF=one.

At block 78 the segment value is one of those contained in the segment box 71. At block 78 The sign of Q is tested and since the example value is negative, the process branches to block 84. At this point the segment number must be one of those contained in segment box 69. At block 84 the sign of the P value is evaluated and since the example value is greater than zero the process branches to grey code demultiplexer block 90. In block 90 the translated grey code modulo 4 value from the channel module 21 is used. In this alias example the measured value is grey code modulo 4=1 then block 90 would decode the segment as seg6 *1. The *1 case is interpreted in block 97 where the state of the grey flag (GF) is tested. In this alias case the GF=1 so the grey code correction factor is set to one and the offset value is negated, resulting in the correct value of −⅓. Output block 72 will correctly report [+P;−⅓;+1]. Thus in this situation the alias case has been resolved to correctly indicate that the transducer is over seg14 [+P;−⅓] and not over seg6 [+P,+⅓]. For this reason the anti-alias bit and decision tree of FIG. 6 are preferred.

It should be understood that the invention has been described in the context of a single embodiment and numerous changes may be made without departing from the scope of the invention.

What is claimed is:

1. A direct access storage device, comprising:

(a) a housing;

(b) a disk, mounted in said housing for rotation about an axis, having a plurality of concentric tracks, each of said tracks having a track width, each pair of adjacent tracks having a track boundary defined as the region between said pair of adjacent tracks, said disk comprising at least one servo sector located on at least one of said tracks, said servo sector having (i) an encoded burst data pattern, (ii) encoded track identifier data pattern, and (iii) an encoded anti-alias data pattern located on a side of said encoded track identifier data pattern on said servo sector which is opposite from a side of said encoded track identifier data pattern on which said encoded burst data pattern is located on said servo sector, said encoded track identifier data pattern extending across said track width and terminating proximate said track boundary, said anti-alias data pattern extending across said track boundary from a first track to an adjacent track;

(c) a transducer assembly, proximate said disk and operatively coupled to a channel module, mounted for movement on an actuator arm; and (d) a demodulator, operatively coupled to said channel module, for converting said encoded track identifier data pattern and said burst data pattern into a position word representing a location of said transducer assembly with respect to said disk.

2. A direct access storage device as recited in claim 1, wherein said anti-alias data pattern extends across said track boundary from a centerline of said first track to a centerline of said adjacent track.

3. A disk for storing data comprising a magnetic media surface having a plurality of concentric tracks, each of said tracks having a track width, each pair of adjacent tracks having a track boundary defined as the region between said pair of adjacent tracks, said disk comprising:

a plurality of servo sectors, at least one servo sector being located on one of said plurality of tracks, each servo sector having (a) an encoded burst data pattern, (b) an encoded track identifier data pattern, and (c) an encoded anti-alias data pattern located on a side of said encoded track identifier data pattern on said servo sector which is opposite from a side of said encoded track identifier data pattern on which said encoded burst data pattern is located on said servo sector, said track identifier data pattern extending across said track width and terminating proximate said track boundary, said anti-alias pattern extending across said track boundary from a first track to an adjacent track.

4. A disk as recited in claim 3, wherein said anti-alias data pattern extends across said track boundary from a centerline of said first track to a centerline of said adjacent track.

\* \* \* \* \*